United States Patent [19]

Holden

[11] Patent Number: 4,575,302

[45] Date of Patent: Mar. 11, 1986

[54] DUMPING MECHANISM

[76] Inventor: John A. Holden, 107 Chedoke Ave., Hamilton, Ontario, Canada, L8P 4P2

[21] Appl. No.: 591,573

[22] Filed: Mar. 20, 1984

[51] Int. Cl.⁴ .......................... B65G 65/23; B65G 7/08
[52] U.S. Cl. .................................... 414/420; 414/742; 414/743
[58] Field of Search ............... 414/420, 742, 743, 714, 414/685, 680

[56] References Cited

U.S. PATENT DOCUMENTS

| 126,466 | 5/1872 | Land | 414/743 X |
| 3,937,502 | 2/1976 | Gay | 414/420 X |

FOREIGN PATENT DOCUMENTS 922556  4/1963  United Kingdom ............... 414/420

Primary Examiner—Jeffrey V. Nase
Attorney, Agent, or Firm—Dennison, Meserole, Pollack & Scheiner

[57] ABSTRACT

A dumping mechanism for tilting a chute to discharge a load from the chute comprises a linkage supporting the chute on a base for movement between a loading position and a dumping position under the action of hydraulic piston and cylinders connected between the linkage and the base. The linkage comprises two parallel links on which the chute is mounted and two further pairs of parallel links pivotally connected to the chute-supporting links and to the base at spaced positions and arranged in mutually crossing relationship to tilt the chute during displacement of the chute from the loading position to the dumping position.

3 Claims, 3 Drawing Figures

DUMPING MECHANISM

FIELD OF THE INVENTION

The present invention relates to a displacement mechanism for displacing and simultaneously tilting a load and is useful in particular, but not exclusively for dumping mechanisms for dumping a load from a chute or from a barrel or other container carried by the mechanism.

BACKGROUND OF THE INVENTION

Dumping mechanisms, commonly referred to as "dumpers" are utilized in industry for discharging loads of loose material, e.g. for loading shot blast machines or other process equipment.

A prior art dumper for such purposes has a chute which is pivotable on a frame about a fixed horizontal axis by a pair of piston and cylinder devices for dumping the contents of the chute.

While such a prior art dumper is useful for some applications, it does present disadvantages due to the fact that the chute pivots about a fixed axis. As a result of such pivotation, the "reach" of the dumper, i.e. the distance through which the chute displaces its contents during a dumping operation, is restricted to a relatively short distance, so that the dumper must be located close to the position at which the contents of the chute are deposited. Consequently, access by operating personnel between this position and the frame on which the chute is supported is restricted.

Furthermore, the use of a fixed axis of pivotation requires a substantial, and sometimes unsatisfactorily high, overhead clearance for pivotation of the chute.

In addition, the pivotation of the chute about the fixed axis has the disadvantage that, as the chute pivots about this axis, the contents of the chute are not discharged gradually from the chute but rather are deposited rapidly and more or less instantaneously.

OBJECTS AND SUMMARY OF THE INVENTION

It is an object of the present invention to provide a novel and improved displacement mechanism having a chute supported by a frame and which enables the contents of the chute to be discharged further from the frame than is possible with the prior art dumping mechanisms.

It is a further object of the present invention to reduce the overhead clearance required for a dumper having a chute movably supported by a frame.

It is a still further object of the present invention to provide a dumper which enables a more gradual, predetermined disposition of a load than has hitherto been possible.

According to the present invention, there is provided a displacement mechanism for displacing and simultaneously tilting a load, comprising means, e.g. a chute, for supporting the load to be displaced and tilted, a linkage carrying the support means, and means for operating the linkage to displace the support means between first and second positions. The linkage comprises first and second links, a first pivot for securing the first and second links for pivotation about respective parallel axes of pivotation, a third link on which the support means is provided, and a second pivot for pivotably securing the first and second links to the third link at positions spaced apart along the third link. The first and second links, are disposed in a mutually crossing arrangement for tilting the third link and therewith the support means during the displacement of the support means between the first and second positions.

The first and second links are not pivotally connected together midway along their lengths, as is the case with a conventional scissors linkage mechanism, and consequently the first and second links move longitudinally relative to one another as the linkage is operated to displace the support means between the first and second positions.

Preferably, the first, and third links are each one of a pair of spaced, parallel links and are pivotally mounted, by means of the first pivot means, on a base, for example in the form of a frame.

By appropriately selecting the dimensions of the linkage, i.e. the positions of the pivots and the lengths of the links, the distance and angle through which the load is displaced can be selectively varied and, thus, the design of the displacement mechanism can readily be modified to adapt the mechanism to vary the length of the displacement and the amount of tilting of the load.

One important application of the present invention is to the provision of the displacement mechanism as a mechanism for dumping or tipping a load. For that purpose, the support means may comprise a chute which, in the first position, is oriented to receive and hold the load and which, in the second position, is oriented to discharge the load under gravity from the chute.

However, the present displacement mechanism may be alternatively employed for a number of other applications, for example in lifeboat davits, steel coil turning, vehicle jacks and small mobile cranes.

Preferably, the operating means comprise hydraulic piston and cylinder means, which can be readily controlled.

BRIEF DESCRIPTION OF THE DRAWINGS

Further features, objects and advantages of the invention will appear from the following description thereof, which is given by way of example and not limitation, and with reference to the accompanying drawings, in which.

DESCRIPTION OF THE PREFERRED EMBODIMENT

Figure 1:
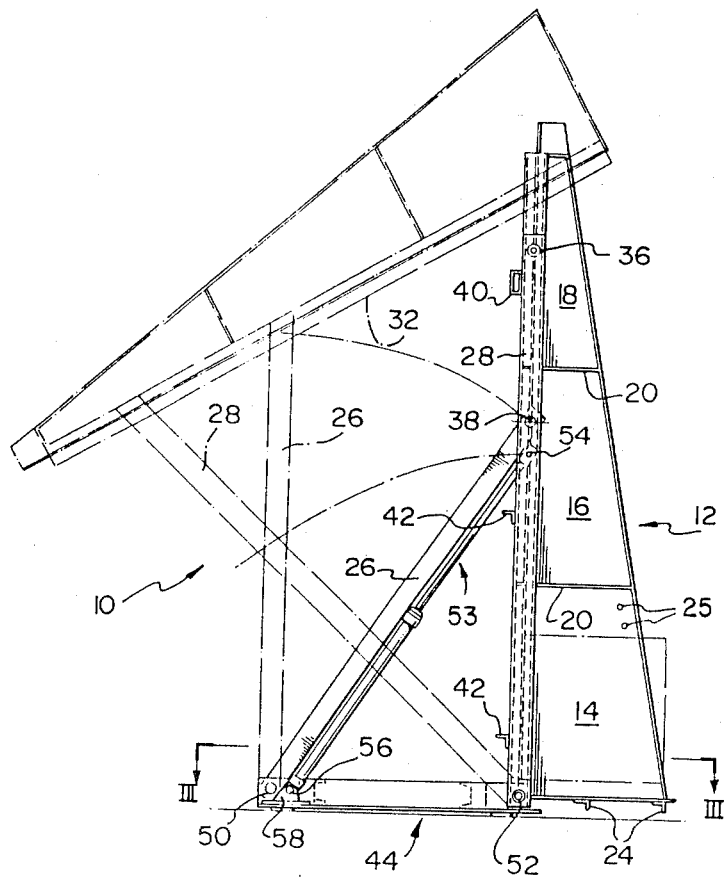
FIG. 1 shows a view in side elevation of a dumping mechanism according to the present invention.

The displacement mechanism shown in the drawings and indicated generally by reference numeral 10 has a chute, indicated generally by reference numeral 12, which in FIG. 1 is shown in full lines in a first, loading position and in broken lines in a second, discharge or dumping position.

The chute 12 has opposite vertical, parallel and generally triangular side walls each formed by three flanged side wall sections 14, 16 and 18, which are joined by welding along adjacent laterally outwardly projecting flanges 20 thereof, and a bottom 22, which is welded to the bottom of the side walls. Channel members 24 are welded across the underside of the bottom 22 for reinforcing the latter and for supporting the chute in its first position.

The side wall sections 14 are formed with aligned holes 25 for receiving a retaining bar (not shown), when required, for securing a load in the chute 12.

Figure 2:
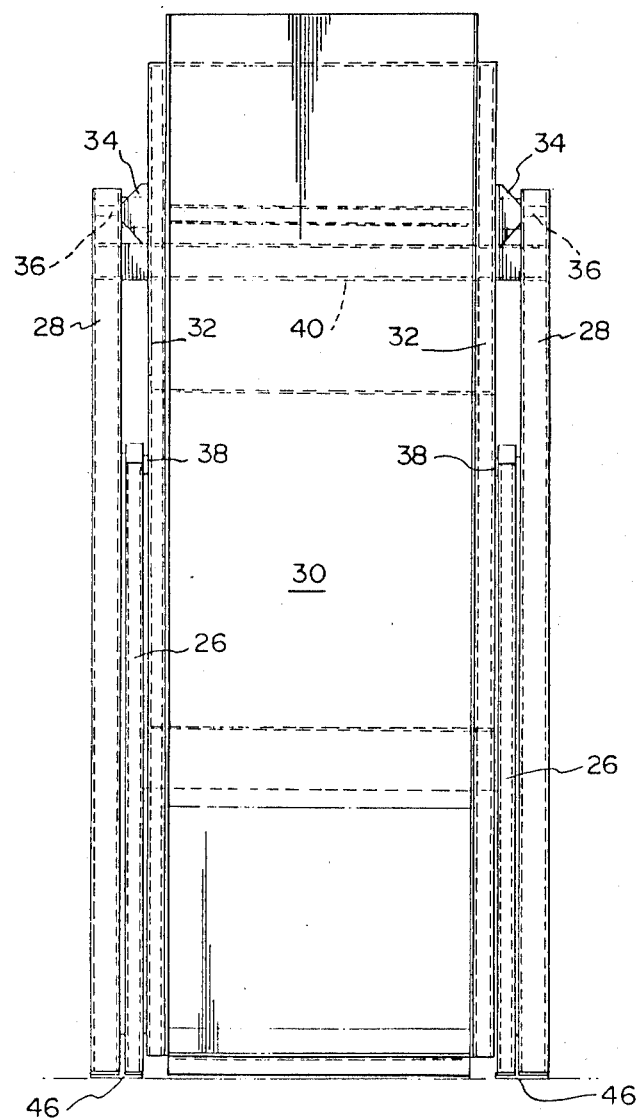
FIG. 2 shows a view in end elevation of the mechanism of FIG. 1.
Figure 3:
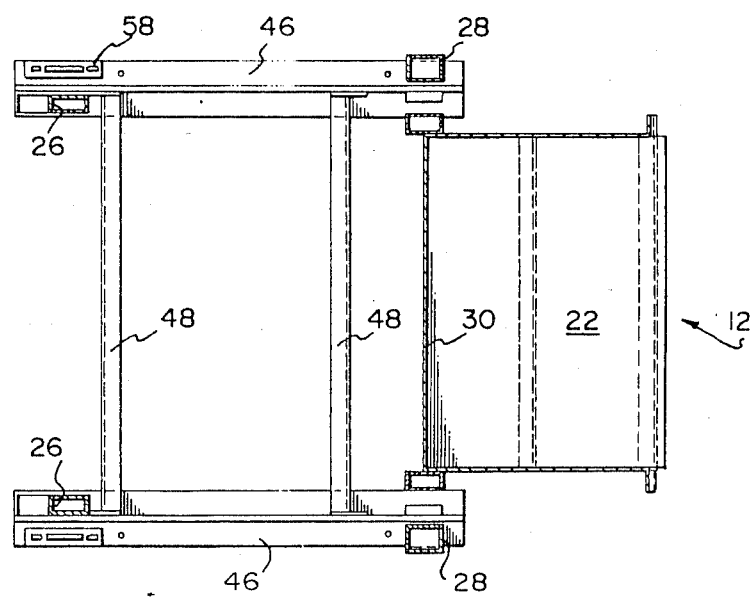
FIG. 3 shows a view taken in cross-section along the line III—III of FIG. 1.

The chute 12 is carried by and pivotally connected to two pairs of parallel links 26 and 28. More particularly, the chute 12 has a rear wall 30 (FIG. 2) which is welded to and carried by two parallel arms 32, formed by beams of rectangular cross-section and provided with lateral projections 34, the links 28 being pivotally connected to the lateral projections 34 by pivots 36 for relative pivotation about a horizontal axis.

The arms 32 are also pivotally connected by pivots 38 to the upper ends of the links 26.

For reinforcement, the arms 28 are connected together near their upper ends by a transverse beam 40 of hollow rectangular cross-section and the arms 32 are connected by transverse L-channel members 42.

The lower ends of the links 26 and 28 are pivotally connected to a base frame indicated generally by reference numeral 44, which comprises a pair of parallel side arms 46 connected by transverse U-channels 48 welded thereto.

More particularly, the lower ends of the links 26 are connected to the side members 46 by pivots 50 at one end of the arms 46, and the lower ends of the links 28 are connected to the side arms 46 by pivots 52 at the opposite ends of the arms 46.

A pair of hydraulic piston and cylinder devices indicated generally by reference numeral 53, are each pivotally connected at one end thereof by a pivot 54 to a respective one of the links 28 and, at the opposite end thereof, by a pivot 56 to a mounting bracket 58 secured to a respective one of the base frame side arms 46.

During operation of the above-described apparatus, the chute 12 is initially located in its first position, in which it is shown in full lines in FIG. 1, and a load (not shown) is placed in the chute 12. The load may, for example, be a load of loose material or articles placed directly into the chute 12 or may be an open-topped container holding such loose material or articles, the container being placed on the chute bottom 22.

The hydraulic piston and cylinder devices 53 are then retracted to cause the links 28 to pivot, about the axis of the pivots 52, in an anti-clockwise direction, as viewed in FIG. 1, towards the position in which one of the links 28 is shown in broken lines in FIG. 1.

As the links 28 are thus pivoted, the links 26 pivot about the axis of pivots 50, likewise in an anti-clockwise direction as viewed in FIG. 1, into the position in which one of the links 26 is shown in broken lines in FIG. 1.

By this pivotation of the links 26 and 28, the chute 12 is raised and displaced from its initial position, and is simultaneously tilted, into the position in which the chute 12 is shown in broken lines in FIG. 1. During this displacement, the links 26 and 28 cross one another, as viewed in FIG. 1, and move longitudinally relatively to one another as they pivot about the axes of the pivots 50 and 52.

If desired, appropriate stop means (not shown) may be provided for limiting the anti-clockwise pivotation of the links 26 and 28, the stop means being provided, for example, in the form of an adjustable abutment projecting upwardly from the base frame side arms 46 for engagement with the underside of the links 28 when the latter reach the position shown in broken lines in FIG. 1.

As will be readily apparent to those skilled in the art, by varying the spacings of the pivots 36, 38, 50 and 52, and thus the lengths of the arms 26 and 28, the distance of the displacement of the chute, the amount of tilting of the chute, the height at which the chute contents are dumped from the chute and the angle at which the chute contents are dumped, can be readily varied.

One of the further advantages of the above-described dumping mechanism is that it has a low head room. Also, by altering the position of the stop means mentioned above, the location of the final or second position of the chute can be varied, so that controlled dumping can be effected, e.g. to ensure that the load is adequately dumped and also to ensure that the "reach" of the mechanism, i.e. the distance, to the left as viewed in FIG. 1, at which the chute contents are discharged from the dumping mechanism is increased relative to prior art dumpers, thus facilitating access between the mechanism and the point of deposition.

In contrast to prior art dumpers having a chute pivotable about a fixed axis, the present mechanism enables the use of a longer chute and a more gradual discharge or dumping of the contents of the chute, thus allowing material to be deposited more slowly, rather than in one more or less instantaneous dump.

The base frame 44 may, if desired, be omitted, in which case the pivots 50 and 52 can be securely mounted on some other support or, for example, on a floor or platform of sufficient strength.

It will also be apparent that, depending upon the required application of the mechanism, the chute 12 may be replaced by some other form of container, or some other form of support, for example a platform or one or more arms for engaging an article or other object to be displaced by the mechanism. Thus, the present invention is not restricted to use as a dumping or tipping mechanism, but may for example be employed for lifeboat davits, steel coil turning devices, vehicle jacking devices or mobile cranes.

Accordingly, the scope of the present invention is not restricted to the above described and illustrated features but may be varied within the scope of the appended claims.

I claim:

1. A displacement mechanism for tilting, laterally displacing, and dumping a load, comprising:

carrying means for carrying a load, said carrying means including wall means; and supporting means for supporting said carrying means for movement between a first position at which said load is supplied to said carrying means and a second position at which said carrying means is tilted to dump said load from said carrying means, said second position being horizontally displaced and rotated more than 90 degrees from said first position, said wall means, in the first position of the carrying means, being generally vertical;

said supporting means comprising pivotal first and second links mounting said carrying means and for pivoting said carrying means through more than ninety degrees and simultaneously tilting and horizontally displacing said carrying means during the movement of said carrying means from said first position to said second position; and drive means for effecting pivotation of said pivotal first and second links and thereby movement of said carrying means between said first and second positions;

said first and second links having upper ends and lower ends;

first and second pivot means pivotally connecting the upper ends of said first and second links, respectively, to said carrying means;

a generally horizontal base; and third and fourth pivot means pivotally connecting the lower ends of said first and second links, respectively, to said base;

said first and second links being laterally spaced and movable in mutually crossing relation to each other to effect the tilting and horizontal displacement of said carrying means during the movement of the carrying means between the first and second positions;

said first pivot means being generally vertically above said second pivot means and said third pivot means being generally vertically below said second pivot means when said carrying means is in said first position;

said first link, in said first position of said carrying means, being generally vertical and generally paralleling the wall means of said carrying means;

said first link, in moving between the first position of said carrying means and the second position of said carrying means, moving from a generally vertical position with the first pivot means at substantially maximum height over said base to a pivotally lowered position, whereby said first pivot means and therewith said carrying means are lowered as said carrying means moves from said first position to said second position.

2. A displacement mechanism as claimed in claim 1, wherein said carrying means comprises a chute having a bottom which is located substantially at the level of the base when said chute is in said first position, said wall means comprising a rear wall on said chute, said rear wall being downwardly tilted to discharge the load therefrom in said second position.

3. A displacement mechanism as claimed in claim 2, wherein said drive means comprises a hydraulic piston and cylinder device, and means for pivotably connecting said hydraulic piston and cylinder device to one of said first and second links.

* * * * *